J. A. WILKIN.
VARIABLE SPEED TRANSMISSION APPARATUS.
APPLICATION FILED AUG. 13, 1919.
1,386,388.
Patented Aug. 2, 1921.
3 SHEETS—SHEET 1.
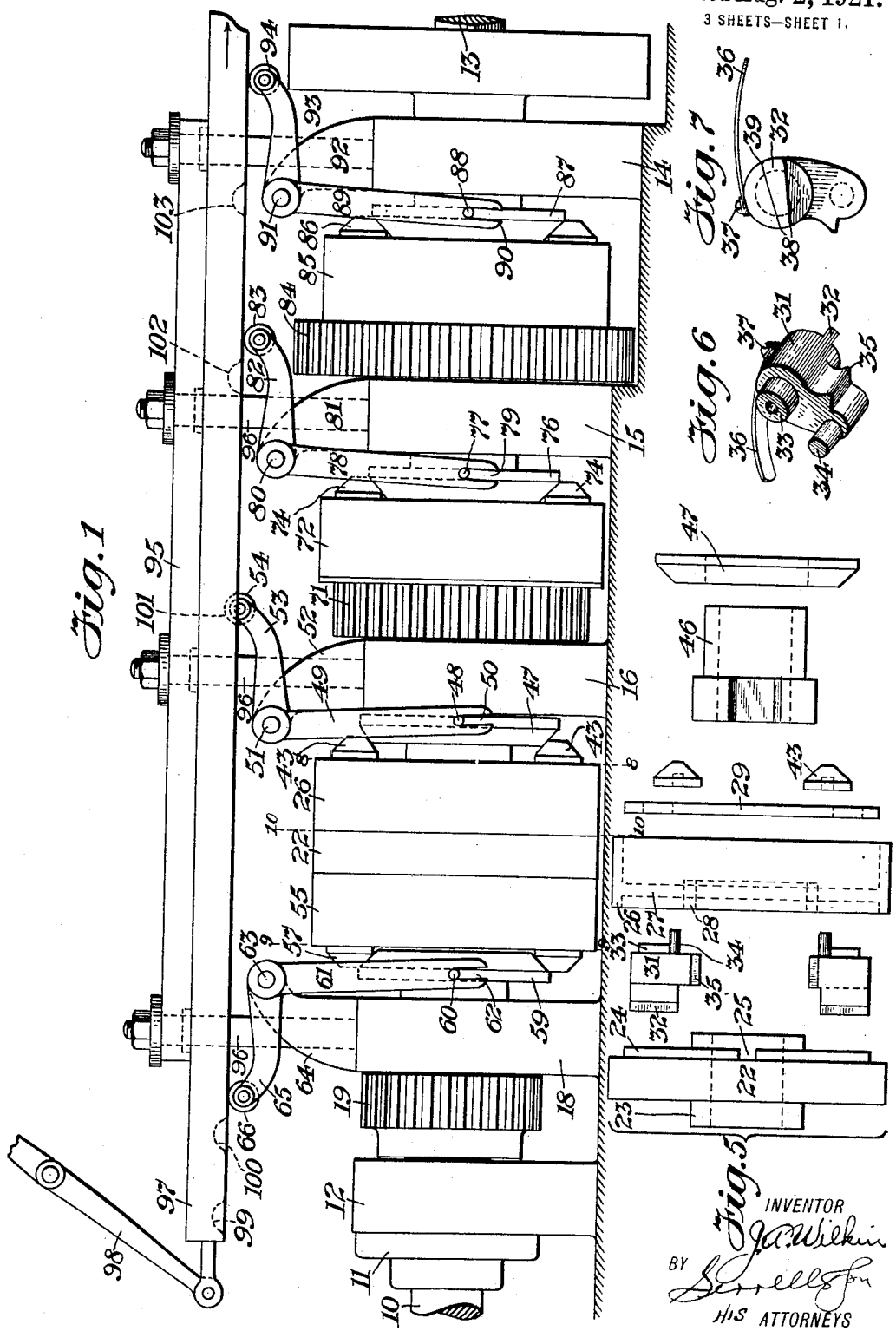
INVENTOR
J. A. Wilkin
BY
HIS ATTORNEYS J. A. WILKIN.
VARIABLE SPEED TRANSMISSION APPARATUS.
APPLICATION FILED AUG. 13, 1919.
1,386,388.
Patented Aug. 2, 1921.
3 SHEETS—SHEET 2.
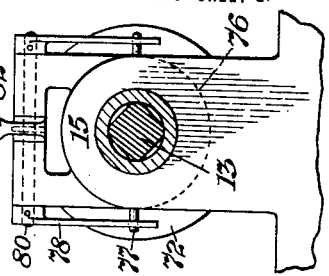
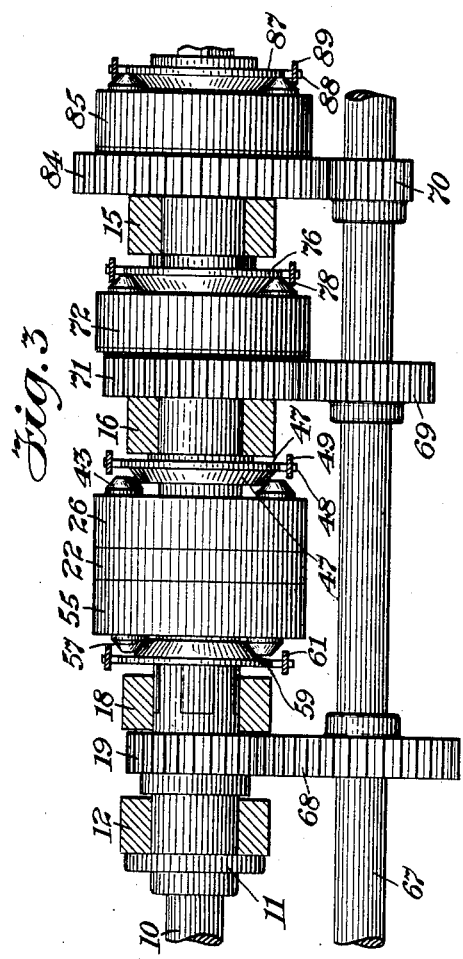
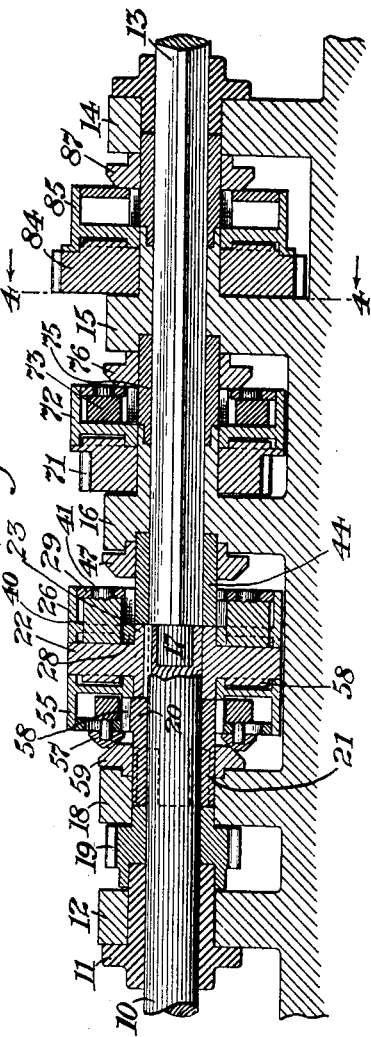
INVENTOR
J. A. Wilkin
BY
HIS ATTORNEYS

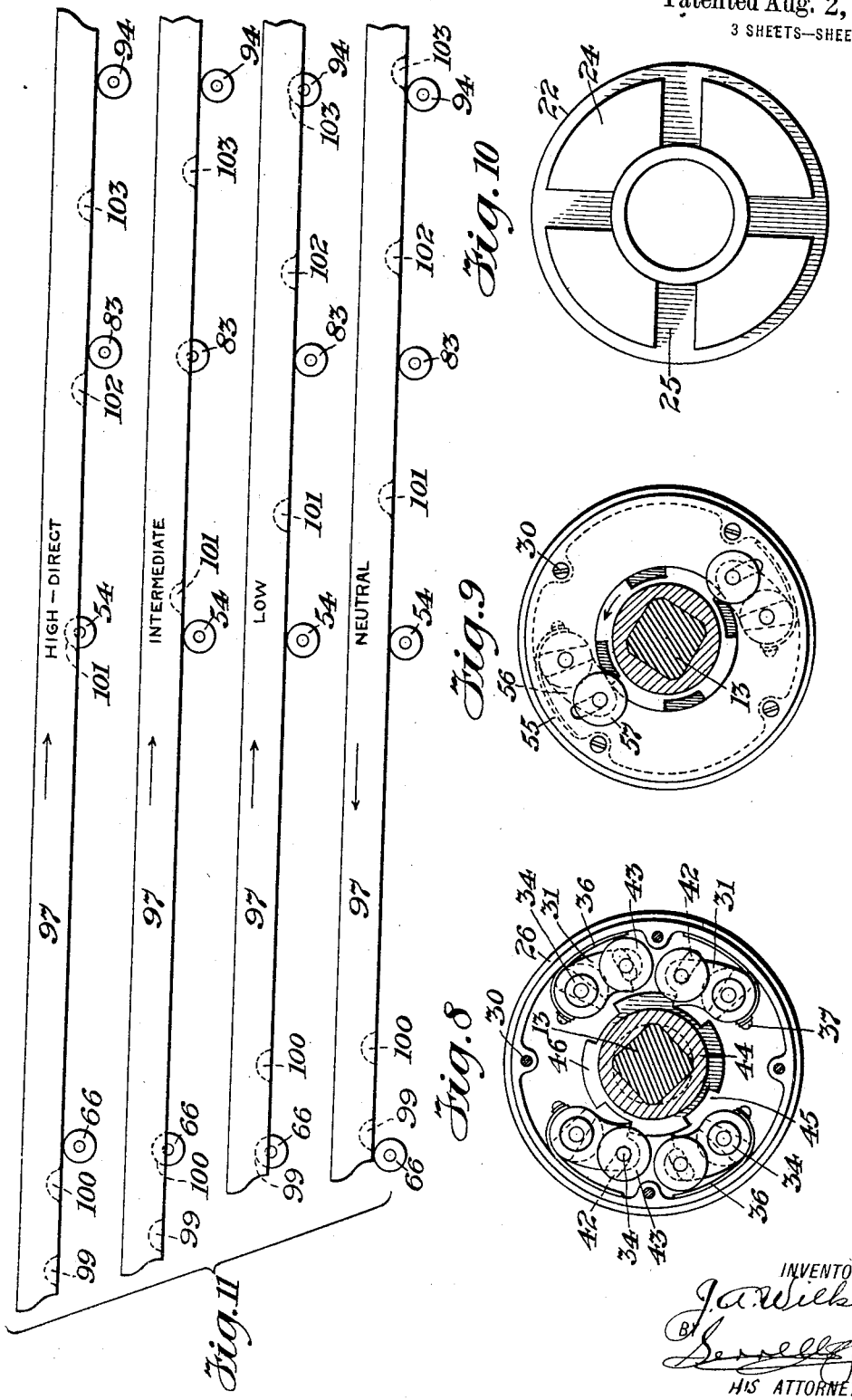

UNITED STATES PATENT OFFICE.

JOSEPH A. WILKIN, OF MATAMORAS, PENNSYLVANIA.

VARIABLE-SPEED-TRANSMISSION APPARATUS.

1,386,388.  Specification of Letters Patent.  Patented Aug. 2, 1921.

Application filed August 13, 1919. Serial No. 317,363.

*To all whom it may concern:*

Be it known that I, JOSEPH A. WILKIN, a citizen of the United States, residing at Matamoras, in the county of Pike and State of Pennsylvania, have invented an Improvement in Variable-Speed-Transmission Apparatus, of which the following is a specification.

This invention relates to the type of variable speed transmission apparatus shown and described in Letters Patent No. 1,136,636, granted to me April 20, 1915. In this type of variable speed transmission apparatus, there is employed a drive shaft, a driven shaft in alinement therewith, a counter shaft together with a plurality of clutch devices associated with a plurality of gears and the drive and driven shafts together with a corresponding number of gears fixed on the counter shaft and always in mesh with the aforesaid gears, the construction being such, that the clutches may be operated to turn the driven shaft directly from the drive shaft and to turn the driven shaft indirectly through the intermediate shaft at any one of a predetermined number of speeds. As hereinbefore stated, the present invention relates to this type of variable speed transmission apparatus and the object of the invention is the provision with such an apparatus of an improvement in the devices or mechanism employed to shift and select the clutch devices and consequently the gears for determining the speed at which the driven shaft is turned. In carrying out the invention, I preferably employ a shift rod with means for imparting a reciprocating movement thereto, together with devices coacting with the shift rod and means for actuating the several clutches, whereby through the motion imparted to the shift rod, and the automatic action of the clutches by application or release of power to or from the clutch parts, any one or more of the clutches may be operated to bring the same into play and thus select the desired gears for a predetermined direction and speed at which it is desired to turn the driven shaft.

The invention will be hereinafter more particularly described in conjunction with the accompanying drawings in which, Figure 1 is an elevation of the transmission apparatus in which the present invention is embodied.

Fig. 2 is a central vertical cross section of the same.

Fig. 3 is a partial plan of the mechanism.

Fig. 4 is a sectional end elevation on line 4—4, Fig. 2.

Fig. 5 is an elevation showing the several parts of the clutch in position ready to be assembled.

Fig. 6 is a perspective view of one of the dogs.

Fig. 7 is a side elevation of a dog.

Fig. 8 is a cross section on line 8—8, Fig. 1.

Fig. 9 is a cross section on line 9—9, Fig. 1.

Fig. 10 is a cross section on line 10—10, Fig. 1 and

Fig. 11 is a diagrammatic view illustrating the various positions of the shift bar in making the several clutch connections to determine the speed at which the driven shaft is turned.

The transmission apparatus in which the present invention is embodied comprises a drive shaft 10, which as will be understood is turned from any suitable prime mover. The drive shaft 10 passes through and is journaled in a sleeve 11 mounted in a bearing block 12. The transmission apparatus also includes a driven shaft 13 which is preferably rectangular in cross section, and passes through various sleeve members which are mounted in bearing blocks indicated at 14, 15 and 16. One end of the driven shaft 13 is cylindrical as indicated at 17 and the adjacent end of the drive shaft 10 is recessed to receive the cylindrical portion of the driven shaft so that these shafts are mounted in alinement.

The drive shaft 10 also passes through a bearing block 18 and between the bearing blocks 12 and 18, a gear 19 is mounted on the drive shaft 10, a portion of the hub of the gear extending into and being journaled in the bearing block 18. On the drive shaft 10 and also journaled in the bearing block 18, there is a sleeve 20. The adjacent ends of the sleeve 20 and the hub of the gear 19 are provided with projections 21 and intervening recesses which interlock with one another so as to connect these members.

On the recessed end of the drive shaft 10, I employ a drive disk 22. This drive disk 22 has a hub 23 and is secured to the drive shaft by being keyed thereto or shrunk thereon or in any other suitable manner. In the right hand face of the drive disk 22 as viewed in the figures of the drawing, I employ a plurality of segmental plates 24 made integral with, or suitably secured to this face of the drive disk in such positions that there are equally spaced recesses 25 between the adjacent ends of the segmental plates. Associated with the same side of the drive disk 22, there is a clutch case 26. This clutch case comprises a rim of the same diameter as the drive disk, together with a web 27 and a hub 28 adapted to fit upon the right hand hub of the drive disk as clearly illustrated in Fig. 2. When the parts are in position, the clutch case 26 is closed by a face place 29 which is secured in position by screws 30 or otherwise.

Within the clutch case, I employ a series of dogs, one of which is indicated at 31 in perspective in Fig. 6. Each dog comprises a body member having on one side thereof a rib 32 and on the opposite side thereof a trunnion 33 and a pin 34; while suitably placed in the body of the dog there is a tooth 35. Associated with each dog for a purpose hereinafter indicated, I may also employ a spring 36 which as shown, is secured to the dog by a screw 37 although the connection may be made otherwise. By reference to Fig. 7, it will be seen that in the preferred form of dog, the sides of the rib 32 are not parallel as indicated in my former patent, but are at an angle to one another with the narrow side of the rib as indicated at 38 on the tooth side of the dog, while at the other end, the corners of the rib are preferably rounded as indicated at 39.

In this particular clutch, which is a reversible clutch, the dogs 31 are employed in pairs and as will be understood may be made in rights and lefts so that as hereinafter described, either set of dogs may be employed depending upon the direction in which it is desired to turn the driven shaft. Each dog 31 is journaled in a bearing provided therefor as indicated at 40 in the web 27 of the clutch case so that when in position, the rib 32 of the dog extends between and lies within the recess at the ends of a pair of segmental plates 24 on the drive disk 22. On the other side of the dog, the trunnion 33 is journaled in a bearing 41 provided therefor in the face plate 29, while the pin 34 of the dog passes through and is adapted to move in an elongated slot 42 also made in the face plate 29 exteriorly of which the pin 34 is fitted with a button 43. One of the sleeves on the driven shaft to which reference has hereinbefore been made is indicated at 44. At one end, this sleeve is journaled in the bearing block 16 and at the other end extends into the clutch casing 26 and within the same is provided with a series of recesses 45 and intervening projections or teeth 46 adapted to be engaged by the teeth of the dogs mounted in the clutch casing. As indicated in Figs. 8 and 9 the extent of the faces of the teeth is appreciably greater than the extent of the recess between the same for the purpose, as will be understood, of insuring a bearing for the teeth of the dogs which are not in use, and at the same time allowing ample space for the dogs to move into engagement with the teeth on the sleeve. On the sleeve 44 there is loosely mounted a collar 47. In oppositely disposed positions, this collar 47 is fitted with pins or trunnions 48. 49 indicates lever arms which at corresponding ends are slotted at 50 to receive the pins 48, and at the opposite ends are connected to a rod 51 which is journaled in brackets mounted on the bearing block 16. Also connected to the rod 51, is a lever arm 53 which at its outer end may be slightly upturned and is preferably provided with a roller 54 so that the lever arm 53 may be actuated to rock the rod 51 and move the collar 47 into and out of engagement with the buttons 43 so as to maintain the dogs out of contact with the teeth on the sleeve 44 or permit the same when power is applied to come into engagement with the teeth, it being understood that when the dogs in this clutch are out of engagement with the teeth of the sleeve, the drive shaft is turned independently of the driven shaft, and when the dogs are in engagement with the teeth of the sleeve, the driven shaft is turned directly from the drive shaft in one direction or the other, depending upon the set of dogs employed.

On the opposite or left hand side of the drive disk 22, there is a clutch case 55. This is the counter shaft clutch and in the case 55 thereof there are arranged one or more sets of dogs 56, each of which is provided with a button 57. These parts are precisely similar to the clutch mechanism hereinbefore described with the exception that the dogs are not rights and lefts, but are all of the same type whether one or two pairs are employed so that this clutch is non-reversible and for this reason a detailed description of these parts is unnecessary. A portion of the sleeve 20 extends within the clutch case 55 and therein is provided with a series of teeth 58 adapted to be engaged by the dogs 56. On the sleeve 20 there is also a collar 59 mounted to slide thereon. In oppositely disposed positions, this collar 59 is provided with pins 60 adapted to receive the slotted ends 62 of lever arms 61, the opposite ends of which are secured on a rod 63. The rod 63 is journaled in brackets 64 mounted on the bearing block 18, and a lever arm 65 is also secured to the rod 63 at one end, while the other end of the lever arm 65 preferably carries a roller 66 in order that by suitable mechanism the lever arm 65 may be caused to actuate the lever arms 61 to move the collar 59 into and out of engagement with the dogs 56 to release the clutch mechanism or to permit the dogs to engage the teeth on the sleeve 20 to connect the drive shaft through the drive disk, this clutch mechanism, and its collar with the gear 19.

I also employ a counter shaft 67 on which there are mounted the gears 68, 69 and 70. The gear 69 meshes with the gear 19 so that when the dogs in the clutch case 55 are in contact with the teeth 58 on the sleeve 20, the counter shaft is driven through the gears 19 and 68.

The gear 69 is continuously in mesh with a gear 71 which is associated with a clutch case 72 in which a plurality of dogs 73 are mounted and provided with buttons 74 in the same manner as in the counter shaft clutch. A sleeve 75 through which the driven shaft 13 also passes is journaled at one end in the bearing block 15 and at the opposite end in an extension of the bearing block 16. This sleeve 75 therefore also passes into the clutch case 72 and therein is provided with a plurality of teeth adapted to be engaged by the dogs 73. On the sleeve 75 there is a collar 76. This collar in oppositely disposed positions is also provided with pins 77 adapted to receive the recessed ends 79 of lever arms 78, the opposite ends of which are secured in a rod or rock shaft 80. The rod 80 is journaled in brackets 81 mounted on the bearing block 15 and a lever arm 82 is connected at one end to the rod 80, while at the other end, this lever arm is fitted with a roller 83.

The gear 70 on the counter shaft 67 meshes continuously with a gear 84 mounted freely on an extension of the bearing block 15. This gear 84 is associated with a clutch case 85 in which a series of dogs are mounted, each dog being provided with a button 86 in the same manner as the non-reversible clutch devices hereinbefore described. On the sleeve forming part of the clutch devices coacting with the dogs in the clutch case 85, there is mounted a collar 87. Like the other similar members, this collar 87 is provided in oppositely disposed positions with pins 88. These pins are received in the recessed ends 90 of lever arms 89, the opposite ends of which are secured on a rod 91. The rod 91 is journaled in brackets 92 mounted on the bearing block 14. At one end a lever arm 93 is also connected to the rod 91, while at the opposite end, this lever arm 93 preferably carries a roller 94.

Together with the parts of the variable speed transmission apparatus hereinbefore described, I employ a frame 95 which is suitably mounted upon posts 96 secured in and extending from the upper portions of the several bearing blocks. Mounted in the frame 95 so as to have a reciprocating motion imparted thereto, is a shift bar 97. This shift bar may be actuated by a shift lever 98 as diagrammatically indicated in Fig. 1, so as to move the lever back and forward over the various parts of the transmission mechanism. In the underside of the shift bar 97, there is a plurality of recesses indicated respectively at 99, 100, 101, 102 and 103. The recesses 99 and 100 are adapted to receive the end of the lever arm 65 or the roller carried thereby; the recess 101 to receive the end of the lever 53 or the roller 54 carried therein; the recess 102 to receive the end of the lever arm 82 or the roller 83 carried thereby, while the recess 103 is adapted to receive the end of the lever arm 93 or the roller 94 carried thereby.

The position of the shift bar and the lengths of the lever arms are such that when the rollers 54, 66, 83 and 94 are on the under surface of the shift bar, the parts of the transmission mechanism are neutral or entirely disconnected. In moving the shift bar 97 forward a predetermined distance, the roller 66 will pass into the recess 99 and the roller 94 into the recess 103. In this position, the drive shaft 10 will be connected to drive the intermediate shaft and the intermediate shaft to turn the driven shaft through the clutch devices in the clutch cases 55 and 85. In moving the shift bar another predetermined distance forward when power has been disconnected by foot clutch or otherwise, these clutch devices will first be disconnected by the rollers 66 and 94 running onto the under face of the shift bar and thus actuating the associated levers and dogs in the clutch cases 55 and 85 as will be understood. Then the roller 66 will move or be forced automatically when power is again applied into the recess 100 and the roller 83 into the recess 102. With the parts in these positions, the driven shaft is turned through the clutch devices in the clutch case 72, the intermediate shaft, and the clutch devices in the clutch case 55. This corresponds to the intermediate gear. By a still further and predetermined movement of the shift bar 97, in a forward direction, the clutch devices are again first moved to the disconnected or neutral positions and then the roller 54 passes or is forced into the recess 101, whereby through the clutch devices in the clutch case 26, the driven shaft is turned directly from the drive shaft.

It will be understood that in the variable speed transmission apparatus hereinbefore described, there are three different speeds for driving the driven shaft, the first speed being when the driven shaft is turned through the gears 84 and 70 from the intermediate shaft; the second speed when the driven shaft is turned through the gears 71 and 69 from the intermediate shaft, and the third when the driven shaft is connected directly to the drive shaft, although, obviously, any number of different speeds may be obtained by merely adding as many clutch devices and gears as may be required. This furthermore includes a reverse gear or means for turning the driven shaft in the opposite direction through the use of an intermediate gear such as is customary in transmission mechanisms.

From the foregoing description, it will be apparent that the sets of dogs are automatically moved by the revoluble member with which the ribs of the dogs are associated whether this revoluble member is the drive disk 22 or the gear 71, the gear 84 or any other similar revoluble member. This is due to the fact that the rib of each dog lies between the adjacent ends of the segmental plates carried by the revoluble members so that when the power is applied to a revoluble member to turn the same in one direction, the action of the ends of the segmental plates against the ribs of the dogs forces the dogs to move so that the same engage teeth on the corresponding sleeves, whereas when the revoluble member is moved or turned in the opposite direction, the opposite faces of the segmental members are forced against the opposite faces of the ribs of the dogs moving or swinging the dogs in the opposite direction, tending to maintain them in such positions that they are out of engagement with the teeth of the corresponding sleeve. It will thus be apparent that in any instance when the shift bar is moved to such a position as to permit one of the rollers to enter its recess or pocket in the shift bar, the action of the corresponding revoluble member will force the roller into the recess or pocket in the shift bar. For example, when the shift bar is moved sufficiently far to permit the roller 54 to enter the recess or pocket 101 in the shift bar, the revoluble movement of the drive disk 22 brings the faces of the segmental members carried thereby, against the corresponding faces of the ribs 32 of the dogs in the clutch case 26, causing the same to swing thus bringing the teeth of the dogs into engagement with the teeth on the sleeve 44 and at the same time forcing the buttons 43 against the collar 47 moving the same to the position shown in Fig. 1, and thereby also swinging the lever arms 49, rocking the rod 51 which in turn swings the lever arm 53, positively forcing the roller 54 into the recess or pocket 101 in the shift bar. This revoluble movement of the drive disk also acts against the other set of dogs in the clutch case 26, tending to move the same in the opposite direction so that the same cannot come into engagement with the teeth on the sleeve 44, which however, are sufficiently long as indicated in Fig. 8 to make it impossible for more than one set of dogs to be in engagement with the teeth of the sleeve at the same time. Obviously, the turning of the drive disk 22 in the opposite direction moves the dogs in the other direction, and also that when the roller 54 is against the face of the shift bar, the collar 47 bears against the button 43 to maintain all the dogs in the clutch case in such positions they cannot come into engagement with the teeth of the sleeve. It will be understood, that while I have shown and described the springs 36 associated with the dogs and the function of the springs is to tend to swing the dogs in contact with the teeth of the sleeve with which they are adapted to engage, it is not at all necessary to employ these springs, and in some instances, they may be entirely dispensed with.

It will furthermore be noted that the movement of the lever arms 49 and 61 are also in unison and that therefore the pins 48 on the collar 47 might be connected by suitable links with the pins 60 on the collar 59 and one or the other of the sets of lever arms 49 and 61 and associated parts be dispensed with. It will also be apparent that instead of employing a single shift bar as hereinbefore described, a multiple shift bar might be employed without departing from the nature and spirit of this invention.

From the foregoing, it will also be understood that a so-called non-reversible clutch as hereinbefore described is an exceedingly important part of the invention, particularly when the mechanism is employed as a transmission in motor vehicles. This is due to the fact that by the construction of this clutch, it becomes automatically engaged when the power is put on or applied, and also becomes automatically disengaged when the power is cut off due to the momentum of the vehicle, and of course the clutch will remain disengaged while the vehicle is coasting so long as the momentum of the car is sufficient to maintain the dogs in the released position. When in this released position, the shift rod may be actuated to the required position for causing the engagement of any other clutch to change the gear when the power is reapplied, or if the shift rod is not moved when the power is again applied, the clutch will become automatically engaged to drive the vehicle. In this action as will be readily understood, automatic action of the engagement of the clutch when the power is applied, causes the clutch to be automatically locked in position by forcing the collars, lever arms and roller into the particular recess in the shift bar which locks the parts in position so long as the power is being applied and also when the power is released or reversed, the action of the dogs automatically releases the collars, lever arms and the roller in each instance so that the parts are automatically unlocked.

It will be understood that the action of the reversible clutch which directly connects the drive and driven shafts is similar to that of the non-reversible clutch, and as the dogs in the reversible clutch are arranged in oppositely disposed pairs when power is applied in a given direction, one set of dogs is thrown into engagement and the other set thrown out of engagement, and when the power is reversed, the action of the dogs is reversed so that this mechanism may be used as a brake in a coasting vehicle due of course to the momentum of the vehicle. Still furthermore, in the use of this apparatus in a motor vehicle, it will be apparent that the gears may be shifted to or from any gear desired irrespective of the speed at which the vehicle may then be traveling.

I claim as my invention:

1. In a transmission apparatus, a shaft, a revoluble member, a plurality of dogs, a sleeve on the said shaft provided with teeth adapted to be engaged by the said dogs, a connection between the dogs and the revoluble member whereby when the revoluble member is turned in one direction the dogs are moved into engagement with the teeth on the sleeve, a collar associated with the said sleeve, a shift bar and devices associated with the collar and shift bar for normally maintaining the collar in such a position as to hold the dogs out of engagement with the teeth on the said sleeve, and when the said shift bar is moved to a predetermined position permitting the said dogs to be moved into position for engagement with the teeth on the sleeve.

2. In a transmission apparatus, a shaft, a revoluble member, a plurality of dogs, a sleeve on the said shaft provided with teeth adapted to be engaged by the said dogs, a connection between the dogs and the revoluble member whereby when the revoluble member is turned in one direction the dogs are moved into engagement with the teeth on the sleeve, a collar slidable on the said sleeve, a shift bar having a recess in the surface thereof, a rod, lever arms secured to said rod and associated with the said collar, a lever arm also connected to the said rod at one end and bearing against the said shift bar at the opposite end to normally maintain the said collar in such a position that the dogs are held out of position in which they engage the teeth of said sleeve and permitting the said dogs to move into position to engage the teeth of the sleeve when the shift bar is moved to that position in which the end of the lever arm registers with the recess in the shift bar, permitting a movement of the lever arms and collar to release the dogs for this function.

3. In a transmission apparatus, a drive shaft, a driven shaft, an intermediate shaft, a plurality of gears associated with the drive and driven shafts, a plurality of clutch devices for connecting and disconnecting the said gears to and from the drive and driven shafts, a corresponding number of gears on the intermediate shaft in mesh with the aforesaid gears, a collar associated with each clutch device, a shift bar, means for actuating the shift bar, devices connecting the shift bar with the said collars, and means whereby when power is applied to the said driven shaft the said shift bar and the means for connecting the same with the said collars are automatically locked, and when the power is shut off the shift bar and the said devices are automatically released.

4. In a transmission apparatus, a drive shaft, a driven shaft, an intermediate shaft, a plurality of gears associated with the drive and driven shafts, a plurality of clutch devices for connecting and disconnecting the said gears to and from the drive and driven shafts, a corresponding number of gears on the intermediate shaft in mesh with the aforesaid gears, a collar associated with each clutch device, a shift bar, means for imparting a reciprocating movement to the shift bar, devices connecting the shift bar with the said collars, and means whereby when power is applied to the said driven shaft the said shift bar and the means for connecting the same with the said collars are automatically locked, and when the power is shut off the shift bar and the said devices are automatically released.

5. In a transmission apparatus, a drive shaft, a driven shaft, an intermediate shaft, a plurality of gears associated with the drive and driven shafts, a plurality of clutch devices for connecting and disconnecting the said gears to and from the drive and driven shafts, a corresponding number of gears on the intermediate shaft in mesh with the aforesaid gears, a collar associated with each clutch device, a shift bar, means for imparting a reciprocating movement to the shift bar, a series of levers connecting the shift bar and the said collars for actuating the collars from the shift bar, and means whereby when power is applied to the driven shaft the said shift bar, together with the collars and series of levers are automatically locked, and when the power is shut off the shift bar, together with the series of levers and collars are automatically released.

6. In a transmission apparatus and in combination, a shaft, a clutch case, clutch devices mounted in the said clutch case, a shift bar, devices connecting the shift bar and clutch devices, and means whereby when the power is applied to the shaft and clutch case, the said shift bar and means connecting the same with the clutch devices are automatically locked, and when the power is cut off, the shift bar and said devices are automatically released.

7. In a transmission apparatus and in combination, a shaft, a clutch case, a plurality of dogs mounted in the said clutch case, a shift bar, devices for connecting the shift bar with the said dogs to operate the latter, and means for connecting the dogs in the said clutch case so that when the power is applied to the shaft and clutch case, the dogs are automatically thrown into engagement and the shift bar and devices connecting the same with the dogs are automatically locked, and when the power is cut off, the said dogs are automatically released and thereby release the shift bar and the devices connecting the same with the dogs.

Signed by me this 11th day of August, 1919.

JOSEPH A. WILKIN.